| United States Patent [19] | [11] Patent Number: 4,584,360 |
| Paul et al. | [45] Date of Patent: Apr. 22, 1986 |

[54] PROCESS FOR THE PREPARATION OF POLYDIORGANOSILOXANES CONTAINING HYDROXYARYLOXY TERMINAL GROUPS

[75] Inventors: Winfried Paul; Werner Nouvertné, both of Krefeld, Fed. Rep. of Germany; Dieter Neuray, Pittsburgh, Pa.; Helmut Steinberger, Leverkusen; Wolfgang Grape, Cologne, both of Fed. Rep. of Germany

[73] Assignee: Bayer Aktiengesellschaft, Leverkusen, Fed. Rep. of Germany

[21] Appl. No.: 600,046

[22] Filed: Apr. 13, 1984

[30] Foreign Application Priority Data

Apr. 19, 1983 [DE] Fed. Rep. of Germany ....... 3314191
Sep. 26, 1983 [DE] Fed. Rep. of Germany ....... 3334782

[51] Int. Cl.$^4$ ............................................. C08G 77/06
[52] U.S. Cl. ........................................ 528/14; 528/25; 528/29; 528/43
[58] Field of Search .................. 528/29, 14, 25, 43

[56] References Cited

U.S. PATENT DOCUMENTS

| 3,419,634 | 12/1968 | Vaughn | 260/824 |
| 3,539,657 | 11/1970 | Noshay et al. | 260/824 |
| 3,821,325 | 6/1974 | Merritt, Jr. et al. | 260/824 R |
| 3,832,419 | 8/1974 | Merritt, Jr. | 260/824 R |
| 3,994,988 | 11/1976 | Laurin | 528/26 |
| 4,022,753 | 5/1977 | Lohse et al. | 260/46.5 R |

*Primary Examiner*—Melvyn I. Marquis
*Attorney, Agent, or Firm*—Gene Harsh; Joseph C. Gil; Aron Preis

[57] ABSTRACT

The subject of the present invention is a process for the preparation of polydiorganosiloxanes containing hydroxyaryloxy terminal groups by reacting polydiorganosiloxanes containing bis-acyloxy terminal groups with diphenols in a molar ratio of 1:2 to 1:20.

3 Claims, No Drawings

PROCESS FOR THE PREPARATION OF POLYDIORGANOSILOXANES CONTAINING HYDROXYARYLOXY TERMINAL GROUPS

The present invention relates to an improved process for the preparation of polydiorganosiloxanes containing α-ω-bis-hydroxyaryloxy terminal groups.

Polydiorganosiloxanes containing hydroxyaryloxy terminal groups are known for example from U.S. Pat. Nos. 3,419,634, 3,821,325 and 3,832,419, which describe their preparation from α,ω-bishalogenopolydiorganosiloxanes and their use as an intermediate product for the preparation of organopolysiloxane-polycarbonate block copolymers.

U.S. Pat. No. 3,539,657 (German Offenlegungsschrift No. 1,913,908) describes the reaction of siloxane chains having acyloxy terminal groups and polyarylene polyether chains having phenolic hydroxyl terminal groups for the preparation of siloxanepolyarylene polyether block copolymers. Although the preparation of polydiorganosiloxanes containing α,ω-bishydroxyaryloxy terminal groups and based on bishalogenopolysiloxanes can be carried out and the process produces a clean product suitable for further use if the reaction and working up are carried out carefully, the process is still not satisfactory since it requires a high excess of bases which are soluble in the reaction medium, the removal of which bases by laborious neutralisation and washing, prior to further processing, leads to high losses in yield by precipitation and emulsion formation. The aim of the invention was therefore to provide an economical process which produces the required α-ω-bis-hydroxyaryloxy polydiorganosiloxanes in a high yield and free from all impurities adversely affecting further processing.

A process has now been found for the preparation of polydiorganosiloxanes containing α,ω-hydroxyaryloxy terminal groups, which is characterised in that polydiorganosiloxanes containing α,ω-bis-acyloxy terminal groups are reacted with diphenols in a molar ratio of 1:2 to 1:20, optionally using inorganic bases, optionally, in particular, alkali metal carbonates or alkaline earth metal carbonates and optionally, preferably, sodium carbonate or potassium carbonate, in at least stoichiometric quantities, based on the moles of the polydiorganosiloxanes containing α-ω-bis-acyloxy terminal groups used. It is possible to use not only homogeneous polydiorganosiloxanes containing α-ω-bis-acyloxy terminal groups but also mixtures of different polydiorganosiloxanes of this kind.

Polydiorganosiloxanes containing α,ω-bis-acyloxyterminal groups to be preferably used are those of the formula (I)

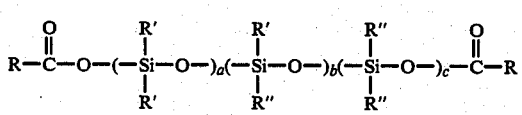

(I)

wherein the number of diorganosiloxy units n=a+b+c=5 to 100, preferably 20 to 80, and R, R' and R" are identical or different and denote hydrogen, linear alkyl, branched alkyl, alkenyl, halogenated linear alkyl, halogenated branched alkyl, aryl or halogenated aryl, but preferably methyl.

In the above formula (I) alkyl is for example $C_1-C_{20}$-alkyl, and alkenyl is, for example, $C_2-C_6$-alkenyl in the above formula (I); aryl is $C_6-C_{14}$-aryl in the above formula (I). In the above formula halogenated means partly or completely chlorinated, brominated or fluorinated. Examples of alkyls, alkenyls, aryls, halogenated alkyls and halogenated aryls are methyl, ethyl, propyl, n-butyl, tert.-butyl, vinyl, phenyl, naphthyl, chloromethyl, perfluorobutyl and perfluorooctyl.

The polydiorganosiloxanes containing α,ω-bis-acyloxy terminal groups to be used as starting compounds are either known (see European Patent Specifications Nos. 000 3285 or 001 2892) or can be prepared by processes known from the literature.

Diphenols to be used for the process according to the invention are:
hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-sulphoxides,
bis-(hydroxyphenyl)-sulphones and
α,α-bis(hydroxyphenyl)-diisopropyl benzenes, and compounds thereof which are alkylated or halogenated in the nucleus. These and other suitable aromatic dihydroxy compounds are listed for example in U.S. Pat. Nos. 3,271,367 and 2,999,846 and in German Offenlegungsschrifts No. 2,063,050 and 2,211,957.

Diphenols to be used according to the invention are in particular those of the formula (II)

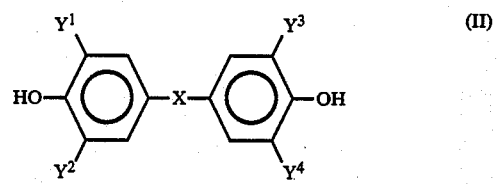

(II)

wherein
X denotes a single bond, $-CH_2-$,

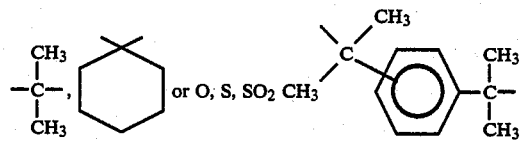

or O, S, $SO_2$ and
$Y^1$ to $Y^4$ are identical or different and denote hydrogen, $C_1-C_4$-alkyl, preferably methyl, or halogen, preferably chlorine or bromine.

Preferred diphenols are for example
2,2-bis-(4-hydroxyphenyl)-propane,
1,1-bis-(4-hydroxyphenyl)-cyclohexane,
2,2-bis-(3,5-dichloro-4-hydroxyphenyl)-propane
2,2-bis-(3,5-dibromo-4-hydroxyphenyl)-propane
2,2-bis-(3,5-dimethyl-4-hydroxyphenyl)-propane,
bis-(3,5-dimethyl-4-hydroxyphenyl)-methane and
bis-(4-hydroxyphenyl)-sulphide.

It is possible to use not only the suitable diphenols by themselves but also mixtures thereof.

In carrying out the process according to the invention an anhydrous mixture of the polydiorganosiloxanes containing acyloxy terminal groups, preferably of the formula (I), and the diphenols, preferably of the formula (II), is formed at temperatures which are sufficiently high to bring about the reaction.

For carrying out the reaction according to the invention it is expedient to add a suitable inert organic solvent to the reaction mixture in order to facilitate the formation of the reaction product. Suitable organic solvents are, for example, methylene chloride, chloroform, ethylene chloride, chlorobenzene etc., although in general any organic solvent can be used which is inert towards the reactants and of which the boiling point is high enough to ensure that the reaction proceeds economically. The concentration of the dissolved reactants is for example 15% by weight.

It has proved advantageous to add the bisacyloxypolydiorganosiloxane dissolved in an inert organic solvent to a solution of the diphenol in an inert organic solvent which optionally additionally contains an inorganic base, although the addition can take place in any other order without complications.

The inorganic bases which are suitable are preferably those which are insoluble in the reaction medium under the reaction conditions and which do not form any soluble products which adversely affect the further processing of the $\alpha,\omega$-bis-hydroxyaryloxy-polydiorganosiloxanes. With respect to insolubility the inorganic bases must fulfil the same requirements as desiccants usually employed for organic solvents. It is expedient to select those inorganic bases which are obtainable in an anhydrous form and which do not enter any undesired side reactions with the diphenols under the reaction conditions.

The inorganic bases which are suitable are in particular alkali metal or alkaline earth metal carbonates, preferably sodium carbonate or potassium carbonate. They are employed in at least stoichiometric quantities, based on the moles of the polydiorganosiloxanes containing $\alpha,\omega$-bis-acyloxy terminal groups used.

If the reactants are reacted without the use of a base, the acid liberated, for example acetic acid, can also be removed by distillation, if appropriate under reduced pressure.

The reaction temperatures are between 0° C. and 150° C., preferably between 70° C. and 130° C.

The polydiorganosiloxanes containing $\alpha,\omega$-bis-hydroxyaryloxy terminal groups, which are obtainable according to the invention, can be isolated per se or in admixture with excess diphenol and stored or advantageously further used in the form of the solution produced in the preparation thereof.

The process according to the invention allows the preparation of polydiorgano-siloxanes containing $\alpha,\omega$-bis-hydroxyaryloxy terminal groups in very good yields, in a simple way, and free from interfering impurities, so that the products obtainable according to the invention can be used as a general rule in all polycondensation and polyaddition reactions in which the corresponding diphenols are used. Thus they can for example be reacted, by customary processes per se or conjointly with other diphenols to give (aromatic) copolyesters, copolycarbonates, copolyethers, copolysulphones, modified epoxide resins and polyurethanes.

Such products, such as for example the siloxane polycarbonates, can, according to U.S. Pat. No. 3,189,662, be used in a known manner for coatings, insulation, as binders for parts and laminates and in adhesives. Specific siloxane copolycarbonates can also be processed into mouldings by thermoplastic methods. They can be used for all applications for which the known aromatic polycarbonates have hitherto been used and for which improved mechanical properties at low temperatures and/or an improved fire behaviour are additionally required, for example in the motor vehicle sector and electrical sector.

In the following the invention is illustrated in more detail by means of examples and is compared with the prior art.

The technological utility of the siloxane copolycarbonates which can be prepared from the $\alpha,\omega$-bishydroxyaryloxypolydiorganosiloxanes obtainable by the process according to the invention is illustrated by a use example.

The characterisation of the products with regard to their degree of conversion and purity is essentially carried out by nuclear resonance spectra, which also allow the determination of the siloxane content. The degree of polymerisation $\overline{P}_n$ found by determining the acyloxy terminal groups or halogen atoms in the starting material is given as the average siloxane block length.

The degree of conversion can be examined by complete saponification and ion chromatographic determination of the carboxylate or halide.

The notch impact strength is determined in accordance with DIN (German Industrial Standard) 53453/ISO R 179 using flat bars (80 mm×10 mm×4 mm) having a V-shaped notch of a notch depth of 2.7 mm.

The determination of the dimensional stability under heat by the Vieat (B) method is carried out according to DIN 53460/ISO 306.

Description of the combustion test:

In accordance with the UL 94 test (Underwriter's Laboratories, Inc.) polycarbonate samples are moulded into bars with the dimensions 127×12.7×1.6 (or 3.2) mm (5.00×0.5×1/16 (or ⅛) inches). The bars are fixed vertically in such a way that the lower edge of the test specimen is 305 mm above a strip of bandaging material. Each test bar is individually ignited by means of two successive ignitions each lasting 10 s, the burning properties after each ignition are observed and the specimen is evaluated accordingly. A Bunsen burner with a 10 mm (⅜ inch) high blue flame of natural gas with a heat content of $3.73 \times 10^4$ kJ/m³ (1,000 BTU per cubic foot) was used for the ignition of the specimen.

The UL 94 V O classification includes the properties described below of materials which have been tested according to the UL 94 instructions. The polycarbonates in this class do not comprise any specimens which burn for longer than 10 s after each action of the test flame; they do not exhibit any total burning time longer than 50 s when the flame is allowed to act twice on each set of specimens; they do not comprise any specimens which burn completely as far as the clip holder fastened to the upper end of the specimen; they do not include any specimens which ignite the wadding situated underneath the specimen as a result of burning drips or particles; neither do they include any specimens which glow for longer than 30 s after the test flame has been removed.

Other UL 94 classifications designate specimens which are less flame-resistant and self-extinguishing and which give off burning drips or particles. These classifications are designated UL 94 V-1 and V-2.

EXAMPLES

Example 1 (Comparative example)

1140 parts by weight of bisphenol A and 22,400 parts by weight of dichloromethane are introduced into a vessel provided with a gas inlet pipe, a cooler, a dropping funnel, a drying tube and a stirrer. While stirring steadily 100 parts by weight of gaseous ammonia are added through the gas inlet pipe which extends to beneath the surface of the liquid until the bisphenol A is dissolved. This takes about 15 minutes. Then a solution of 3,023 parts by weight of $\alpha,\omega$-bischloropolydimethylsiloxane, polydimethylsiloxane, $\overline{P}_n=40$, in 5,600 parts by weight of dichloromethane are added to the solution over a period of about 15 minutes, the stirring being continued for a further hour. Then about 6,000 parts by weight of water are added and the mixture is acidified with concentrated phosphoric acid until a pH of about 6 is reached. The organic layer is separated off and purified further by washing it with water until the ammonium ions have been removed. Yield: 57% of theory.

Example 2

1140 parts by weight of bisphenol A and 22,400 parts by weight of chlorobenzene are introduced into a vessel which is provided with a cooler, a drying tube, a dropping funnel and a stirrer. The mixture is heated to 100° C. and 276 parts by weight of potassium carbonate are added. Then a solution of 3068 parts by weight of $\alpha$-$\omega$-bisacetoxypolydimethylsiloxane, polydimethylsiloxane, $\overline{P}_n=40$, in 5,600 parts by weight of chlorobenzene are added to the mixture with refluxing over a period of 15 minutes, the stirring being continued for a further two hours. The mixture is cooled to about 80° C. and filtered while still hot. Yield: 98% of theory.

Example 2a 1,140 parts by weight of bisphenol A and 22,400 parts by weight of chlorobenzene are introduced into a vessel which is provided with a cooler, a drying tube, a dropping funnel, a stirrer and a bridge-shaped stillhead with a receiver. A solution of 3,068 parts by weight of $\alpha,\omega$-bisacetoxypolydimethylsiloxane, $\overline{P}_n=40$, in 5,600 parts by weight of chlorobenzene is added, with refluxing and stirring, over a period of 15 minutes Then about a third of the quantity of solvent is distilled off, the acetic acid produced during the reaction passing over as an azeotropic mixture with the chlorobenzene. Yield: 97% of theory.

Example 3 (Use example)

2,280 parts by weight of bisphenol A, 1,010 parts by weight of sodium hydroxide, 31,100 parts by weight of water, 13,500 parts by weight of dichloromethane and 10,700 parts by weight of chlorobenzene and 25 parts by weight of phenol are added to a tenth of the solution from example 2 in a reaction flask which is equipped with a stirrer, a phosgene inlet tube, a reflux condenser, an internal thermometer and a dropping funnel. 1,646 parts by weight of phosgene are introduced at room temperature, the pH being kept at between 12 and 13 by adding 45% strength sodium hydroxide solution. The introduction takes about one hour. Then 8 parts by weight of triethylamine are added and the mixture is stirred for a further 45 minutes at a pH of 12 to 13. The cocondensate is worked up by methods customary for polycarbonates.

The relative solution viscosity is 1.29 (measured at a concentration of 5 g/l in dichloromethane at 25° C.). The content of polydimethylsiloxane is 9.4% by weight, based on the total weight of the copolycarbonate.

Results of tests relating to practical application:

| Notch impact strength | at 20° C., 36 kJ/m² |
| --- | --- |
|  | at −40° C., 19 kJ/m² |
| Dimensional stability under heat according to Vicat (B) | 137° C. |
| Fire test according to UL 94 | V-0 in 3.2 mm |

We claim:

1. A process for the preparation of polydiorganosiloxanes containing $\alpha,\omega$-hydroxy-aryloxy terminal groups, characterized in that at least one polydiorganosiloxane containing $\alpha,\omega$-bisacyloxy terminal groups is reacted with at least one diphenol in a molar ration of 1:2 to 1:20, using at least one inorganic base selected from the group consisting of alkali metal carbonates and alkaline earth metal carbonates in at least stoichiometric quantities, base on the moles of the polydiorganosiloxanes containing $\alpha,\omega$-bisacyloxy terminal groups used.

2. The process according to claim 1, characterized in that said polydiorganosiloxane containing $\alpha,\omega$-bisacyloxy terminal groups, conforms to the formula

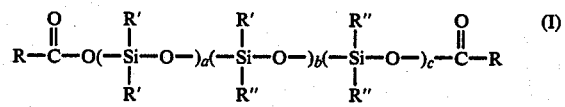

wherein the sum $a+b+c$ is 5 to 100, and wherein R, R' and R'' are identical or different and denote hydrogen, linear alkyl, branched alkyl, alkenyl, halogenated linear alkyl, halogenated branched alkyl, aryl or halogenated aryl.

3. The process in accordance with claim 1 wherein said diphenol conforms to the formula

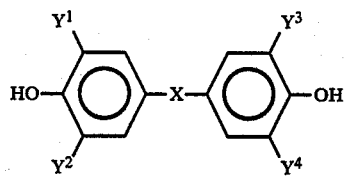

wherein
X denotes a single bond, —CH₂—,

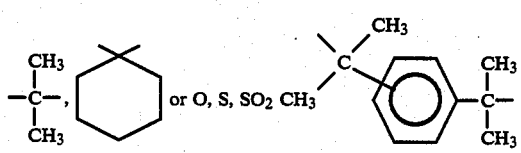

and $Y^1$ $Y^4$ are identical or different and denote hydrogen, $C_1$-$C_4$ alkyl or a halogen atom.

* * * * *